UNITED STATES PATENT OFFICE 2,616,849

COPOLYMERS OF MALEIC ANHYDRIDE WITH ESTERS OF ITACONIC ACID AND SALTS THEREOF AS VISCOSITY INDEX IMPROVERS AND POUR POINT DEPRESSANTS

John J. Giammaria, Woodbury, N. J., assignor to Socony-Vacuum Oil Company, Incorporated, a corporation of New York No Drawing. Application May 11, 1949, Serial No. 92,727

20 Claims. (Cl. 252—39)

This invention relates to the preparation of a new class of chemical compounds which are especially useful as mineral lubricating oil additives and to mineral oil compositions containing these compounds. The compounds contemplated herein are copolymers formed by the reaction of maleic anhydride with esters of itaconic acid, and metal salts thereof.

It has already been shown in the prior art that maleic anhydride can be copolymerized with various unsaturated compounds. However, as far as these applicants are aware, it has not been suggested heretofore that maleic anhydride could be copolymerized with esters of itaconic acid and that the copolymers so formed would be oil-soluble compounds, which, upon addition to mineral lubricating oils, would effectively lower the pour point and/or improve the viscosity indices of such oils.

It is the principal object of this invention to prepare copolymers of maleic anhydride with esters of itaconic acid. It is another object to provide improved mineral lubricating oil compositions containing these copolymers, said oil compositions having substantially lower pour points and higher viscosity indices than exhibited by the oils alone. Other objects of the invention will become apparent from the following description.

The new class of copolymers contemplated herein are prepared by copolymerizing maleic anhydride with a diester of itaconic acid, represented by the general formula:

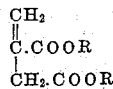

where R is a member of the group consisting of alkyl, aryl, alkaryl and cycloaliphatic groups. Preferably, R is a straight chain alkyl group derived from a primary, normal, aliphatic alcohol of from 1 to 18 carbon atoms. Esters of primary, normal, aliphatic alcohols of from 14 to 16 carbon atoms are particularly preferred. Also preferred are esters of mixtures of primary, normal, aliphatic alcohols having an average of about 14 carbon atoms per molecule. Such mixtures are marketed under the trade names "Lorol-B" and "Lorol-5," by the E. I. du Pont de Nemours Co. These alcohol mixtures contain primary, normal, aliphatic alcohols, ranging from 10 to 18 carbon atoms, in approximately the following proportions:

|  | "Lorol-B" | "Lorol-5" |
|---|---|---|
|  | Percent | Percent |
| C$_{10}$ | 2.5 | 2.8 |
| C$_{12}$ | 55.0 | 61.0 |
| C$_{14}$ | 20.5 | 21.0 |
| C$_{16}$ | 9.0 | 11.0 |
| C$_{18}$ | 13.0 | 2.2 |
| Ave. No. C Atoms | 13.5 | 12.7 |

The ester reactant, of course, may be prepared by esterifying itaconic acid with the desired alcohol by methods known to the art. For example, the acid and alcohol may be heated together in the presence of a catalyst, such as sulfuric acid. A solvent, such as benzene, xylene or dioxane may also be used, if desired.

As non-limiting examples of suitable itaconic acid ester reactants, there may be mentioned: dimethyl itaconate, dipropyl itaconate, dihexyl itaconate, dioctyl itaconate, didecyl itaconate, didodecyl itaconate, ditetradecyl itaconate, di-"Lorol-B" itaconate, di"Lorol-5" itaconate, dihexadecyl itaconate, dioctadecyl itaconate, diethenyl itaconate, dibutenyl itaconate, diheptenyl itaconate, diundecenyl itaconate, ditridecenyl itaconate, diheptadecenyl itaconate, diethylhexyl itaconate, dicyclohexyl itaconate, diphenyl itaconate, dinaphthyl itaconate, di(butylphenyl) itaconate and di(octylnaphthyl) itaconate.

The copolymerization of maleic anhydride with the itaconic acid ester is carried out under ordinary polymerization conditions, viz., heating the reaction mixture at temperatures of from about 75° C. to about 150° C. in the presence of a small amount, i. e. from about 0.1 per cent to about 5.0 per cent by weight, of an organic peroxide catalyst, such as benzoyl peroxide. The reaction may be run in bulk or in the presence of a solvent, such as benzene, xylene or dioxane.

The time of reaction will vary from about one to several hours depending on the amount of catalyst used and the mode of polymerization, i. e. whether the reaction is carried out in bulk or in solution. In general, bulk polymerization is preferred, the reaction time usually being from about one to about two hours. The proportions of reactants may be varied between from 1 mole of maleic anhydride to about 4 moles of itaconic ester and vice versa, although from 0.5 to 1 mole of the anhydride per mole of ester is generally preferred.

Typical copolymers contemplated by the present invention are the following: maleic anhydride-dimethyl itaconate copolymer, maleic anhydride-dipropyl itaconate copolymer, maleic anhydride-diamyl itaconate copolymer, maleic anhydride-diheptyl itaconate copolymer, maleic anhydride-dinonyl itaconate copolymer, maleic anhydride-diundecyl itaconate copolymer, maleic anhydride-ditetradecyl itaconate copolymer, maleic anhydride-di"Lorol-5" itaconate copolymer, maleic anhydride-di"Lorol-B" itaconate copolymer, maleic anhydride-dihexadecyl itaconate copolymer, maleic anhydride-dioctadecyl itaconate copolymer, maleic anhydride-diethenyl itaconate copolymer, maleic anhydride-dihexenyl itaconate copolymer, maleic anhydride-didecenyl itaconate copolymer, maleic anhydride-ditetradecenyl itaconate copolymer, maleic anhydride-dioctadecenyl itaconate copolymer, maleic anhydride-diisooctyl itaconate copolymer, maleic anhydride-dicyclohexyl itaconate copolymer, maleic anhydride-diphenyl itaconate copolymer, maleic anhydride-dinaphthyl itaconate copolymer and maleic anhydride-di(octylphenyl) itaconate copolymer.

As indicated hereinbefore, metal salts of the copolymers are also contemplated herein. Suitable metals are those of groups I through VIII of the periodic table of the elements. The preferred metals are the metals of group II, of which magnesium, calcium, zinc, strontium, cadmium and barium are particularly preferred.

The metal salts may be prepared by any of the commonly used methods for the preparation of salts of acidic compounds. Thus, the maleic anhydride-itaconic acid ester copolymer may be dissolved in benzene and neutralized with aqueous or alcoholic KOH or NaOH. To prepare polyvalent metal salts the sodium or potassium salt may be reacted with the aqueous or alcoholic solution of an inorganic or organic salt of the desired metal. The copolymer may also be treated with the alcoholate of the desired metal; or, in some cases, may be treated directly with the hydroxide, such as barium hydroxide. In general, it is preferred to maintain a substantially anhydrous medium in preparing the metal salts. Since the metal salts of the copolymers are highly resinous in nature, it is preferred to prepare them as mineral oil blends, containing up to about 50% by weight of the salt.

As typical of the metal salts contemplated herein the following may be mentioned as non-limiting examples: sodium salt of maleic anhydride-diamyl itaconate copolymer, copper salt of maleic anhydride-ditetradecyl itaconate copolymer, magnesium salt of maleic anhydride-dihexadecyl itaconate copolymer, aluminium salt of maleic anhydride-ditetradecenyl itaconate copolymer, tin salt of maleic anhydride-dihexadecenyl itaconate copolymer, antimony salt of maleic anhydride-"Lorol-B" alcohol itaconate copolymer, chromium salt of maleic anhydride-dioctadecyl itaconate copolymer, iron salt of maleic anhydride-dioctadecenyl itaconate copolymer, magnesium salt of maleic anhydride-diphenyl itaconate copolymer and zinc salt of maleic anhydride-dicyclohexyl itaconate copolymer.

The properties of the copolymers and their salts vary somewhat with the alcohol used to prepare the itaconic ester. Thus, with the lower aliphatic alcohol esters, such as dimethyl and diethyl itaconate, a fairly hard resin is obtained, while with dioctyl and dilauryl itaconate the copolymer is a soft, gummy resin. As a rule the esters of the alcohols of four or more carbon atoms produce oil-soluble copolymers, while salts of the copolymers show the greatest oil solubility when the ester used in preparing the copolymer is derived from an alcohol of 8 or more carbon atoms.

Although all the oil-soluble copolymers or salts thereof derived from any of the esters aforedescribed are suitable as viscosity index improvers in mineral oils, those effective as pour point depressants are limited to the copolymers and salts prepared from the esters of the relatively pure, primary, normal, aliphatic alcohols of from 14 to 16 carbon atoms, or from the mixtures of primary, normal, aliphatic alcohols containing an average of approximately 14 carbon atoms per molecule such as the "Lorol-B" and "Lorol-5" alcohol mixtures.

The following examples will serve to illustrate the methods of preparation of the copolymers and copolymer metal salts described herein

EXAMPLE I

*Maleic anhydride-dimethyl itaconate copolymer*

Twenty-four and one-half grams of maleic anhydride, 39.5 grams of dimethyl itaconate and 1.92 grams of benzoyl peroxide were mixed and slowly heated, while stirring, to 115° C. Although external heating was discontinued, the reaction was sufficiently exothermic to maintain this temperature for about 15 minutes. At the end of this time, heat was again applied and the reaction mixture was heated ½ hour longer at 115° C. The mixture was cooled and dissolved in acetone. This solution was poured into benzene but the copolymer failed to precipitate. The solution was then washed with hot water, filtered and the solvents removed by distillation. The residue (product I) was a dark brown resin.

EXAMPLE II

*Maleic anhydride-di-n-octyl itaconate copolymer*

Seven and three-tenths grams of maleic anhydride, 34.0 grams of di-n-octyl itaconate and 1.24 grams of benzoyl peroxide were reacted as described in Example I. The resulting copolymer (product II) was a gummy resin which was readily soluble in lubricating oil.

EXAMPLE III

*Maleic anhydride-di-n-dodecyl itaconate copolymer*

Nineteen grams of maleic anhydride, 90.0 grams of di-n-dodecyl itaconate and 3.2 grams of benzoyl peroxide were mixed and slowly heated, while stirring, to 100° C. Although heating was discontinued at this point, the temperature rose to 140° C. over a ten minute period. As the temperature subsided, the mixture was again heated to 145° C. and held for 1 hour. The mixture was transferred to a distilling flask and heated to 200° C. at 1 mm. pressure of Hg. On cooling, the resulting copolymer (product III) was a gummy resin which was readily soluble in lubricating oil.

EXAMPLE IV

*Maleic anhydride-di"Lorol-B" itaconate copolymer*

Four and nine-tenths grams of maleic anhydride, 27.0 grams of di"Lorol-B" itaconate and 0.96 gram of benzoyl peroxide were mixed and heated at 100° C. for 24 hours. The viscous copolymer was cooled and dissolved in benzene. The solution was then washed with hot water, filtered and the solvent removed by distillation. The resulting copolymer (product IV) was a soft, gummy resin which was readily soluble in lubricating oil.

EXAMPLE V

*Maleic anhydride-di-n-tetradecyl itaconate copolymer*

Nineteen grams of maleic anhydride, 101.0 grams of di-n-tetradecyl itaconate and 3.6 grams of benzoyl peroxide were mixed and reacted as described in Example III. The resulting copolymer (product V) was a soft, gummy resin soluble in lubricating oil.

EXAMPLE VI

*Maleic anhydride-di-n-cetyl itaconate copolymer*

Twenty grams of maleic anhydride and 71.0 grams of di-cetyl itaconate were mixed with 25 cc. of xylene and heated, while stirring, to 70° C. Two and seven-tenths grams of benzoyl peroxide were then added and the temperature was slowly raised to 100° C. Although heating was stopped at this point, the temperature gradually rose to 130° C. As the temperature subsided, heat was again applied to 145° C. and held for one hour. The very viscous solution was purified as previously described. The resulting copolymer (product VI) was readily soluble in lubricating oil.

EXAMPLE VII

*Maleic anhydride-di-n-octadecyl itaconate copolymer*

Five and nine-tenths grams of maleic anhydride, 38.0 grams of di-n-octadecyl itaconate and 1.32 grams of benzoyl peroxide were mixed and heated to 110° C. for four hours. The copolymer (product VII) was cooled and purified as previously described. It was a brittle, waxy resin, soluble in lubricating oil.

EXAMPLE VIII

*Mg salt of maleic anhydride-di-mixed alcohol itaconate copolymer*

A maleic anhydride-itaconic acid ester copolymer was prepared as follows: Thirty grams of itaconic acid were esterified with 100.0 g. of a mixture of alcohols containing 30.0 g. of n-octadecanol-1 and 70.0 g. of "Lorol-5." This mixed ester was mixed with 22.0 g. of maleic anhydride and 1.4 g. of benzoyl peroxide and slowly heated to 100° C. The exothermic reaction which occurred at this point resulted in a gradual temperature rise to 127° C. even though the heating mantle was removed. The very viscous mixture was allowed to cool to room temperature and dissolved in 300 cc. of A. S. T. M. naphtha. The solution was vacuum filtered to remove unreacted maleic anhydride which was substantially insoluble in the naphtha. The solvent was then removed by distillation. The very viscous copolymer had a neutralization number of 64.0.

Twenty-five grams of this copolymer were dissolved in 75 cc. of benzene and added to magnesium methylate (prepared by reacting 1.0 g. of metallic magnesium with 125 cc. of methanol using $I_2$ as catalyst). The mixture was heated at reflux for 1½ hours. The solvents were then distilled, thereby raising the temperature to 135° C. which was held for 1 hour. The mixture was cooled and 50.0 g. of mineral oil were added. This was then diluted with benzene and vacuum-filtered through a layer of adsorptive clay. The solvent was removed by distillation yielding the magnesium salt as a 33% blend in mineral oil (product VIII). This blend showed by analysis 0.67% Mg corresponding to 2.01% Mg in the pure pure salt.

EXAMPLE IX

*Mg salt of maleic anhydride-di-mixed alcohol itaconate copolymer*

A maleic anhydride-itaconic acid ester copolymer was prepared as described in Example VIII except that the itaconic acid ester was prepared from a mixture of 25% n-octadecanol-1 and 75% of the "Lorol-5" alcohol mitxure. Three per cent benzoyl peroxide was used.

Forty grams of this copolymer were dissolved in 150 cc. of benzene and the solution was neutralized with a petrohol solution containing 4.0 g. of KOH. To the solution of the potassium salt was added a petrohol solution containing 9.0 g. of $MgCl_2.6H_2O$. The mixture was gradually heated to distill the alcohol and then filtered through a layer of adsorptive clay. Sixty grams of mineral oil were added to the benzene solution after which the benzene was removed by distillation yielding the magnesium salt as a 40% blend in oil (product IX). The oil blend showed by analysis 0.83 Mg which corresponds to 2.07% Mg in the pure compound.

EXAMPLE X

*K salt of maleic anhydride-di-mixed alcohol itaconate copolymer*

A maleic anhydride-itaconic acid ester copolymer similar to that of Example IX was prepared except that 2.0% benzoyl peroxide was used instead of 3.0%. The copolymer had a neutralization number of 80.0.

Twenty-five grams of this copolymer were dissolved in 100 cc. of benzene and neutralized with a petrohol solution containing 2.0 g. of KOH. Seventy-five grams of mineral oil were added after which the alcohol and benzene were removed by distillation to yield the potassium salt as a 25% oil blend (product X).

EXAMPLE XI

*Mg salt of maleic anhydride-di-mixed alcohol itaconate copolymer*

Fifty grams of the copolymer from Example X were converted to the magnesium salt, as described in Example IX. The salt was prepared as a 25% blend in mineral oil, (product XI) and showed by analysis 0.5% Mg corresponding to 2.0% Mg in the pure salt.

EXAMPLE XII

*Ba salt of maleic anhydride-di-mixed alcohol itaconate copolymer*

Fifty grams of the copolymer from Example X were dissolved in 100 cc. of benzene and the solution was neutralized with a petrohol solution containing 4.7 g. of KOH. To the solution of the potassium salt was added a methanol solution containing 13.0 g. of $BaBr_2$. The mixture was then heated to distill the alcohol and was purified as described in Example IX. The barium salt was obtained as a 25% blend in mineral oil (product XII) and showed by analysis 2.5% Ba corresponding to 10.0% in the pure salt.

EXAMPLE XIII

Zn salt of maleic anhydride-di-mixed alcohol itaconate polymer

Fifty grams of the copolymer from Example X were dissolved in 100 cc. of benzene and the solution was neutralized with a petrohol solution containing 4.7 g. of KOH. To the solution of the potassium salt was added a petrohol solution containing 6.0 g. of ZnCl₂. The mixture was heated to distill the alcohol and was purified as described in Example IX. The zinc salt was obtained as a 25% blend in mineral oil (product XIII).

EXAMPLE XIV

Mg salt of maleic anhydride-di-n-dodecyl itaconate copolymer

A copolymer of maleic anhydride and di-n-dodecyl itaconate was prepared by the method of Example III. The copolymer had a neutralization number of 95.0.

Thirty grams of this copolymer were converted to the magnesium salt as described in Example IX. The salt was obtained as a 25% blend in mineral oil (product XIV) and showed by analysis 0.73% Mg corresponding to 2.92% Mg in the pure salt.

EXAMPLE XV

Mg salt of maleic anhydride-di-n-tetradecyl itaconate copolymer

A copolymer of maleic anhydride and di-n-tetradecyl itaconate was prepared by the method of Example III. This copolymer had a neutralization number of 104.0.

Twenty grams of this copolymer were converted to the magnesium salt as described in Example IX. A 25% oil blend of the salt (product XV) showed by analysis 0.68% Mg corresponding to 2.72% in the pure salt.

EXAMPLE XVI

Mg salt of maleic anhydride-di-n-hexadecyl itaconate copolymer

A copolymer of maleic anhydride and di-n-hexadecyl itaconate was prepared by the method of Example VI.

Six and one-half grams of this copolymer were converted to the magnesium salt as described in Example IX. A 25% oil blend of the salt (product XVI) showed by analysis 0.74% Mg corresponding to 2.96% Mg in the pure salt.

EXAMPLE XVII

Mg salt of maleic anhydride-di-n-octadecyl itaconate copolymer

A copolymer of maleic anhydride and di-n-octadecyl itaconate was prepared using 2.0% benzoyl peroxide.

Forty-two grams of this copolymer were converted to the magnesium salt as described in Example IX. A 33% blend of the salt in mineral oil (product XVII) showed by analysis 0.52% Mg corresponding to 1.56% Mg in the pure salt.

The effectiveness of the copolymer products and salts contemplated herein as pour point depressants for wax-bearing lubricating oils is illustrated by the data presented in Table I. The results were obtained in a Duo-sol-refined, Mid-Continent-type base oil having a kinematic viscosity of 12.2 centistokes at 210° F. The concentrations shown represent the amount of pure additive, i. e. either copolymer or copolymer salt, present in the oil blend.

Table I

| Compound Blended in Oil | Conc. Wt. Percent | A.S.T.M. Pour Point, °F. |
|---|---|---|
| None | 0.00 | +20 |
| Product II | 0.125 | +20 |
| Product III | 0.125 | +20 |
| Product IV | 0.125 | −15 |
| Do | 0.062 | −5 |
| Product V | 0.125 | −20 |
| Do | 0.062 | −10 |
| Product VI | 0.125 | +10 |
| Do | 0.062 | +10 |
| Product VII | 0.125 | +20 |
| Product VIII | 0.05 | −15 |
| Do | 0.025 | −15 |
| Product IX | 0.05 | −10 |
| Do | 0.025 | +5 |
| Product X | 0.05 | −10 |
| Do | 0.025 | +5 |
| Product XI | 0.05 | −10 |
| Do | 0.025 | +10 |
| Product XII | 0.05 | −10 |
| Do | 0.025 | +10 |
| Product XIII | 0.05 | −10 |
| Do | 0.025 | +10 |
| Product XIV | 0.05 | +20 |
| Product XV | 0.05 | 0 |
| Do | 0.025 | +15 |
| Product XVI | 0.05 | −20 |
| Do | 0.025 | 0 |
| Product XVII | 0.05 | +20 |

The data presented in Table I also serve to illustrate the critical nature of the itaconic ester reactant required to produce a copolymer or copolymer metal salt which will function as a pour point depressant. Thus, it will be noted that the only products which are effective as pour point depressants are those prepared from itaconic esters derived from the various mixtures of primary, normal, aliphatic alcohols having an average of about 14 carbon atoms and from the relatively pure primary, normal, aliphatic alcohols of from 14 to 16 carbon atoms, such as tetradecyl and cetyl alcohol (products IV-VI and VIII-XIII, XV and XVI). The products obtained with other pure, straight chained, primary, aliphatic alcohols, such as di-n-octyl, di-n-dodecyl and di-n-octadecyl alcohols, on the other hand, yielded ineffective products (products II, III, VII, XIV, and XVII).

Table II lists data illustrating the effect of certain of the products contemplated herein as viscosity index improvers. The results were obtained in an acid-refined, Mid-Continent-type base oil having a viscosity index of 80.5.

Table II

| Compound Blended in Oil | Conc. Wt. Percent | Kinematic Viscosity, cs.— | | Viscosity Index |
|---|---|---|---|---|
| | | @ 100° F. | @ 210° F. | |
| None | 0.0 | 30.56 | 4.84 | 80.5 |
| Example V | 2.0 | 32.99 | 5.22 | 95.7 |
| Example IX | 1.0 | 32.16 | 5.07 | 89.5 |
| Example XI | 1.0 | 32.86 | 5.18 | 93.5 |

The results presented in Table II are typical of the whole group of copolymer products and metal salts thereof described herein, any of the other products being similarly useful in oil.

The amount of copolymer or copolymer salt (the product of the invention) to be incorporated in the lubricating oil will vary with the particular oil and with the desired improvement. Thus, concentrations of from about .05 per cent to about 10.0 per cent of the pure compound are usually used, although amounts as low as .01 per cent often provide significant improvement. With respect to the upper limit, of course, it will be uneconomical to add more than is necessary to impart the desired properties. Generally, not over about 50% is used.

The additives of this invention may be blended in lubricating oils containing other additives, such as other types of pour point depressants and viscosity index improvers as well as detergents, antioxidants, anti-foam agents etc.

This invention is not to be limited to any particular maleic anhydride-itaconic acid ester copolymers or salts thereof herein disclosed or to particular copolymer products or salts in mineral oil compositions, but only to the following claims in which it is desired to claim all novelty inherent in the invention.

I claim:

1. A mineral lubricating oil containing from about 0.01% to about 50% of a compound selected from the group consisting of a copolymer produced by copolymerizing maleic anhydride with a diester of itaconic acid, said diester having been obtained by esterifying itaconic acid with a primary, normal, aliphatic alcohol having from 1 to 18 carbon atoms, and a metal salt of said copolymer.

2. A mineral lubricating oil containing from about 0.01% to about 50% of a copolymer produced by copolymerizing maleic anhydride with a diester of itaconic acid, said diester being obtained by esterifying itaconic acid with a primary, normal aliphatic alcohol having from 1 to 18 carbon atoms.

3. A mineral lubricating oil containing from about 0.01% to about 50% of a copolymer produced by copolymerizing maleic anhydride with a diester of itaconic acid, said diester being obtained by esterifying itaconic acid with a primary, normal, aliphatic alcohol having from 10 to 18 carbon atoms.

4. A mineral lubricating oil containing from about 0.01% to about 50% of a copolymer produced by copolymerizing maleic anhydride with a diester of itaconic acid, said diester being obtained by esterifying itaconic acid with a mixture of primary, normal, aliphatic alcohols having an average of about 14 carbon atoms per molecule.

5. A mineral lubricating oil containing from about 0.01% to about 50% of a copolymer produced by copolymerizing maleic anhydride with di-tetradecyl itaconate.

6. A mineral lubricating oil containing from about 0.01% to about 50% of a magnesium salt of a copolymer produced by copolymerizing maleic anhydride with a diester of itaconic acid, said diester being obtained by esterifying itaconic acid with a mixture of primary, normal, aliphatic alcohols having an average of about 14 carbon atoms per molecule.

7. A mineral lubricating oil containing from about 0.01% to about 50% of a magnesium salt of a copolymer produced by copolymerizing maleic anhydride with di-tetradecyl itaconate.

8. A mineral lubricating oil containing from about 0.01% to about 50% of a magnesium salt of a copolymer produced by copolymerizing maleic anhydride with di-cetyl itaconate.

9. As a new composition of matter, a compound selected from the group consisting of a copolymer produced by copolymerizing maleic anhydride with a diester of itaconic acid in the absence of styrene, said diester having been obtained by esterifying itaconic acid with a primary, normal, aliphatic alcohol having from 1 to 18 carbon atoms, and a metal salt of said copolymer.

10. As a new composition of matter, a copolymer produced by copolymerizing maleic anhydride with a diester of itaconic acid in the absence of styrene, said diester being obtained by esterifying itaconic acid with primary, normal, aliphatic alcohol having from 1 to 18 carbon atoms.

11. As a new composition of matter, a copolymer produced by copolymerizing maleic anhydride with a diester of itaconic acid in the absence of styrene, said diester being obtained by esterifying itaconic acid with a primary, normal, aliphatic alcohol having from 10 to 18 carbon atoms.

12. As a new composition of matter, a copolymer produced by copolymerizing maleic anhydride with a diester of itaconic acid in the absence of styrene, said diester being obtained by esterifying itaconic acid with a mixture of primary, normal, aliphatic alcohols having an average of about 14 carbon atoms per molecule.

13. As a new composition of matter, a copolymer produced by copolymerizing maleic anhydride with di-tetradecyl itaconate in the absence of styrene.

14. As a new composition of matter, a magnesium salt of a copolymer produced by a copolymerizing maleic anhydride with a diester of itaconic acid in the absence of styrene, said diester being obtained by esterifying itaconic acid with a mixture of primary, normal, aliphatic alcohols having an average of about 14 carbon atoms per molecule.

15. As a new composition of matter, a magnesium salt of a copolymer produced by copolymerizing maleic anhydride with di-tetradecyl itaconate in the absence of styrene.

16. As a new composition of matter, a magnesium salt of a copolymer produced by copolymerizing maleic anhydride with dicetyl itaconate in the absence of styrene.

17. A mineral lubricating oil containing from about 0.01% to about 50% of a metal salt of a copolymer produced by copolymerizing maleic anhydride with a diester of itaconic acid, said diester being obtained by esterifying itaconic acid with a primary, normal, aliphatic alcohol having from 1 to 18 carbon atoms.

18. A mineral lubricating oil containing from about 0.01% to about 50% of a metal salt of a copolymer produced by copolymerizing maleic anhydride with a diester of itaconic acid, said diester being obtained by esterifying itaconic acid with a primary, normal, aliphatic alcohol having from 10 to 18 carbon atoms.

19. As a new composition of matter, a metal salt of a copolymer produced by copolymerizing maleic anhydride with a diester of itaconic acid in the absence of styrene, said diester being obtained by esterifying itaconic acid with a primary, normal, aliphatic alcohol having from 1 to 18 carbon atoms.

20. As a new composition of matter, a metal salt of a copolymer produced by copolymerizing maleic anhydride with a diester of itaconic acid in the absence of styrene, said diester being obtained by esterifying itaconic acid with a primary, normal, aliphatic alcohol having from 10 to 18 carbon atoms.

JOHN J. GIAMMARIA.

REFERENCES CITED

The following references are of record in the file of this patent:

UNITED STATES PATENTS

| Number | Name | Date |
| --- | --- | --- |
| 2,340,110 | D'Alelio | Jan. 25, 1944 |
| 2,366,517 | Gleason | Jan. 2, 1945 |
| 2,380,304 | Gleason | July 10, 1945 |
| 2,384,595 | Blair | Sept. 11, 1945 |